Oct. 6, 1970     D. A. LOCK     3,532,930
LASER CONTROL CIRCUIT
Filed Dec. 22, 1967
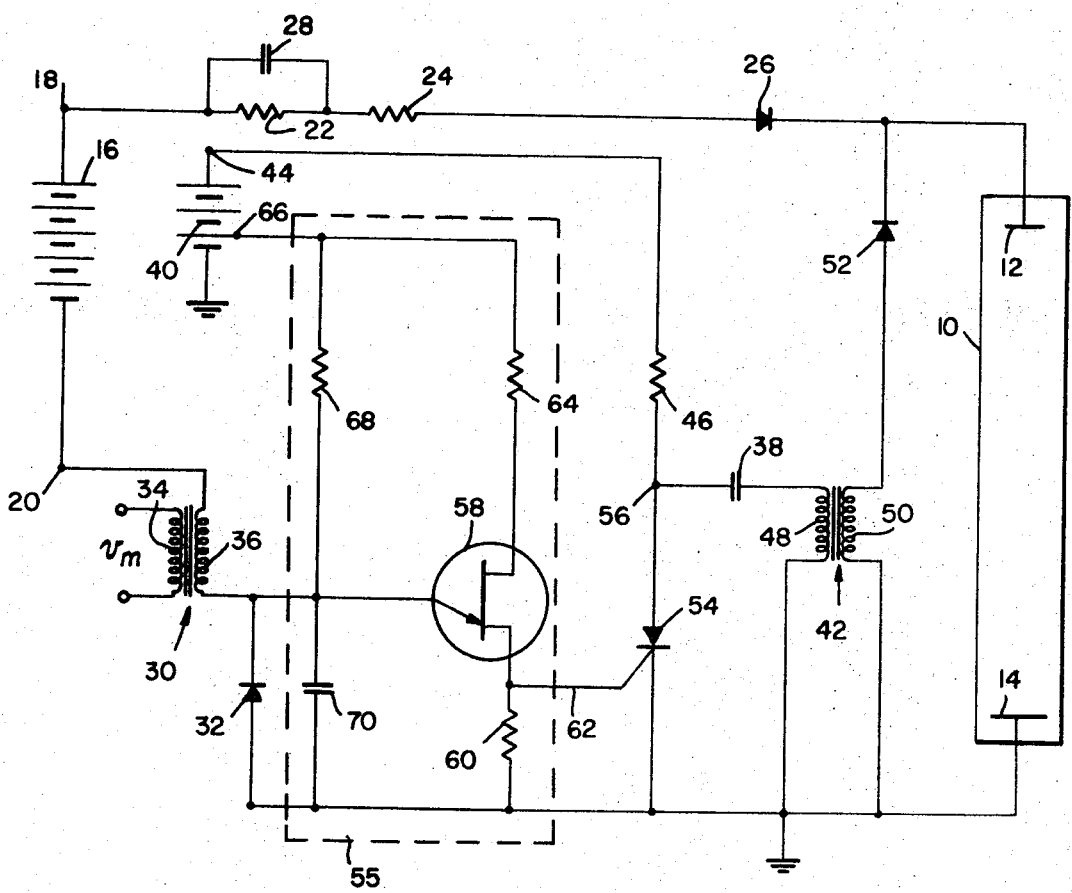
Douglas A. Lock,
INVENTOR.
BY.
Paul M. Coke
ATTORNEY.

United States Patent Office 3,532,930
Patented Oct. 6, 1970

3,532,930
LASER CONTROL CIRCUIT
Douglas A. Lock, Manhattan Beach, Calif., assignor to Hughes Aircraft Company, Culver City, Calif., a corporation of Delaware
Filed Dec. 22, 1967, Ser. No. 692,851
Int. Cl. H01s *3/09;* H05b *37/02, 39/09*
U.S. Cl. 315—225                                    10 Claims

ABSTRACT OF THE DISCLOSURE

In the disclosed laser control circuit the discharge from a capacitor, in response to oscillator generated control pulses applied to a controlled switch, through the primary winding of a transformer induces a starting pulse in the transformer secondary winding which is coupled across the electrodes of the laser discharge tube. A series circuit coupled between the discharge tube electrodes includes a source of DC potential, a source of modulating voltage, and means to control the oscillator to prevent generation of the control pulses when an electrical discharge has been established in the discharge tube.

---

This invention relates to laser control, and more particularly relates to a circuit for both starting operation of an electrical discharge type gas laser and for applying a modulating signal to the laser during its steady state operation.

In the past, the starting of electrical discharge type gas lasers was accomplished by means of a high voltage pulse from a pulse transformer connected in series with a DC power supply, the laser tube, and a control relay. Once an electrical discharge had commenced within the laser tube, the relay sensed the discharge current and functioned to remove power from the starting circuitry. Since a single starting pulse may be insufficient to initiate electrical discharge in the laser tube, it is necessary to provide a plurality of laser starting pulses. However, the relay response time is sufficiently slow so that after a given starting pulse is able to initiate the laser discharge, subsequent starting pulses may be applied to the laser tube before the starting circuitry is disengaged. These subsequent pulses may then extinguish the laser discharge which has just commenced. Moreover, for applications requiring a modulated laser beam, the starting pulse transformer presents a sufficiently high impedance to the modulating voltage source that the magnitude of modulating voltage which appears across the discharge tube is greatly reduced from its original value.

Accordingly, it is an object of the present invention to provide a control circuit for both commencing operation of and introducing a modulating signal to an electrical discharge type gas laser, and which control circuit is able to achieve faster starting of the laser and inactivation of the starting circuitry than has been afforded by the prior art.

It is a further object of the present invention to provide a laser control circuit of the type mentioned above which, once an electrical discharge has been established in the laser, prevents the application of additional starting pulses to the laser which might extinguish the discharge therein.

It is a still further object of the present invention to provide a laser control circuit of the foregoing type which, during steady state operation, allows a greater portion of the introduced modulating voltage to appear across the laser than has been accomplished in the past.

In accordance with the aforegoing objects, a control circuit according to the invention functions to commence electrical discharge in and subsequently apply a modulating signal to a laser discharge tube having first and second electrodes and containing a gas capable of being ionized by electrical discharge between the electrodes. A capacitor and the current path of a controlled switch are coupled in series across the primary winding of a transformer, the secondary winding of which is coupled between the discharge tube electrodes. A charging current is supplied to the capacitor, and an oscillator applies control pulses to the control electrode of the controlled switch to establish current flow through its current path, allowing the capacitor to discharge through the transformer primary winding and induce a pulse in the secondary winding which is applied across the discharge tube electrodes. A series circuit coupled between the discharge tube electrodes includes a source of DC potential, a source of modulating voltage, and means for controlling the oscillator to prevent the application of the control pulses to the control electrode of the controlled switch when an electrical discharge has been established in the discharge tube.

Additional objects, advantages and characteristic features of the present invention will become readily apparent from the following detailed description of a preferred embodiment of the invention when considered in conjunction with the accompanying drawing in which the sole figure is a schematic circuit diagram illustrating a laser control circuit in accordance with the invention.

Referring to the figure with greater particularity, there is shown a laser discharge tube 10 having an anode 12 and a cathode 14. The discharge tube 10 contains a gaseous laser working medium, for example a mixture of helium and neon, capable of being ionized by electrical discharge between the electrodes 12 and 14. Such discharge produces sufficient energy transfer between appropiate energy levels of the working medium that laser action is able to occur. The control circuitry of the present invention is adapted to control both the initial turn-on of the laser and to allow steady state operation with a modulating signal.

Electrical power for operation of the laser tube 10 is furnished from a DC potential source 16 which, while illustrated as a battery, may be any suitable DC power supply which furnishes an appropriate potential (for example 1200 volts) between its positive terminal 18 and its negative terminal 20. A pair of current limiting resistors 22 and 24 and the anode-cathode path of a blocking diode 26 are connected in series between the positive source terminal 18 and the laser anode 12, a bypass capacitor 28 being connected in parallel with the resistor 22. A modulating voltage source, illustrated as a transformer 30, and the cathode-anode path of a sensing diode 32 are connected in series between the negative source terminal 20 and the laser cathode 14. The modulating voltage source 30 serves to introduce a modulating signal (of frequencies of the order of 10 kc. for example) onto the electrical discharge within the laser tube 10 and, as illustrated, may comprise a transformer, the primary winding 34 of which receives a modulating voltage $v_m$ and the secondary winding 36 of which is connected between the terminal 20 and the cathode of diode 32.

The starting of operation of the laser discharge tube 10 is afforded by the controlled discharge of a storage capacitor 38, energized from an auxiliary DC potential source 40, through a voltage step-up pulse transformer 42. Although illustrated as a battery, the DC potential source 40 may be any suitable DC power supply which furnishes an appropriate potential (for example 250 volts) between its positive terminal 44 and a reference level designated as ground. A charging resistor 46 is connected between the source terminal 44 and one electrode of the capacitor 38, the other electrode of capacitor 38 being connected to primary winding 48 of the transformer 42. The resistance and capacitance values of resistor 46 and capacitor 38, respectively, are selected to provide a time constant significantly shorter than the oscillation period of an oscillator, or timing, circuit 55 to be described in detail below.

The end of the primary winding 48 electrically remote from capacitor 38 is connected to the cathode 14 of the laser tube 10 and is also connected to ground. Secondary winding 50 of transformer 42 is connected between the cathode 14 of the tube 10 and one terminal of an AC coupling, DC source isolating device 52, the other terminal of which is connected to the anode 12 of the laser tube 10. The device 52 provides a low AC impedance and a high DC impedance in at least one current flow direction, and functions to couple pulses from the transformer secondary winding 50 to the laser tube anode 12 while preventing DC current flow from the positive source terminal 18 through the winding 50. While the device 52 is preferably a diode having its anode connected to the secondary winding 50 and its cathode connected to the laser tube anode 12, alternatively, a coupling capacitor could be used as the device 52.

In order to control the discharge of the capacitor 38 through the transformer 42, a controlled switch 54, driven from oscillator 55, is coupled between the junction 56 between capacitor 38 and resistor 46 and the grounded end of primary winding 48. As is illustrated, the controlled switch 54 may be a silicon controlled rectifier having its anode-cathode path connected between the junction 56 and ground and its control, or gate, electrode connected to receive output pulses from the oscillator 55.

The oscillator 55 is constructed around a unijunction transistor 58, one base electrode of which is grounded through a load resistor 60 and is also connected to oscillator output lead 62 which supplies pulses to the gate electrode of the controlled rectifier 54. The other base electrode of the unijunction transistor 58 is connected via a resistor 64 to a tap 66 on the DC potential source 40 so that an operating potential, for example 25 volts, for the oscillator 55 may be obtained. The emitter electrode of the unijunction transistor 58 is connected to the junction between diode 32 and secondary winding 36 of the modulating signal introducing transformer 30. A resistor 68 is connected between the potential supplying terminal 66 and the emitter electrode of the unijunction transistor 58, while a capacitor 70 is connected between the emitter electrode and ground.

In the operation of the control circuit of the present invention to initially start the discharge in the laser tube 10, the capacitor 38 becomes charged by current flowing through resistor 46 from potential source 40. The unijunction transistor 58 undergoes alternating periods of conduction and non-conduction at a frequency determined by the resistance and capacitance values of resistor 68 and capacitor 70, respectively, so that the oscillator 55 provides a series of output pulses on lead 62 at the oscillation frequency. An output pulse from the oscillator 55 causes the controlled rectifier 54 to fire, i.e. render its anode-cathode path heavily conductive of current. A current flow path is thus established which allows the capacitor 38 to discharge through the primary winding 48 of the transformer 42. A high voltage pulse (of an amplitude of the order of 10 kv., for example) is thereby induced in the transformer secondary winding 50 and is applied across discharge tube electrodes 12 and 14 to ionize the gas within tube 10 and produce an electrical discharge between the electrodes 12 and 14. The pulse induced in the secondary winding 50 is prevented from reaching the potential source 16 by the diode 26, which is reverse biased during the occurrence of such pulse, to prevent the pulse from being attenuated by the relatively low impedance of the potential source 16. It is pointed out that if, for any reason, the pulse from the secondary winding 50 is unable to establish an electrical discharge in the tube 10, the foregoing operation is repeated to produce a pulse in the secondary winding 50 for each output pulse from the oscillator 55 until a discharge does commence in the tube 10.

When an electrical discharge is established within the tube 10, current flows from the positive terminal 18 of the potential source 16 through resistors 22 and 24, diode 26, tube 10, diode 32, and transformer winding 36 to the negative terminal 20 of the potential source 16. Current flow through the diode 32 produces a sufficiently low impedance across capacitor 70 that the emitter electrode of the unijunction transistor 58 is effectively short-circuited to ground, thereby precluding the transistor 58 from conducting. As a result, no further pulses are applied to the gate electrode of the controlled rectifier 54, and hence no further turn-on pulses are applied to the laser tube 10 from the transformer 42. Moreover, after electrical discharge has commenced in tube 10, the diode 52 becomes reverse biased, thereby preventing current from the potential source 16 from flowing through the transformer secondary winding 50.

During steady state operation of the control circuit, discharge current flow through the laser tube 10 may be modulated by the modulating signal $v_m$ applied to the transformer 30. Although the discharge tube 10 provides a negative resistance over a portion of its current-voltage operating range, the resistors 22 and 24 provide sufficient positive resistance that a net positive load resistance appears across potential source terminals 18 and 20. Capacitor 28, however, provides a lower impedance than resistor 22 at the modulating frequency, thereby allowing a greater portion of the modulating voltage to appear across the tube 10.

Although the present invention has been shown and described with reference to a particular embodiment, nevertheless, various changes and modifications obvious to a person skilled in the art to which the invention pertains is deemed to lie within the spirit, scope and contemplation of the invention.

What is claimed is:

1. A laser control circuit comprising: a laser discharge tube having first and second electrodes and containing a gas capable of being ionized by electrical discharge between said electrodes; a transformer having a primary winding and a secondary winding, said secondary winding being coupled between said first and second electrodes; a controlled switch having a current path and a control electrode, said current path and a capacitor being coupled in series across said primary winding; means for applying charging current to said capacitor; oscillator means for applying control pulses to said control electrode to establish current flow through said current path; and a series circuit coupled between said first and second electrodes, said series circuit including a source of DC potential, a source of modulating voltage, and means coupled between said second electrode and an input terminal for said oscillator for controlling said oscillator to prevent the application of said control pulses to said control electrode when an electrical discharge has been established in said discharge tube between said first and second electrode.

2. A laser control circuit according to claim 1 wherein a terminal of said secondary winding is coupled to one of said first and second electrodes, and wherein means are coupled between another terminal of said secondary winding and the other of said first and second electrodes for providing a low AC impedance and a high DC impedance in at least one current flow direction.

3. A laser control circuit according to claim 2 wherein the said means comprises a diode.

4. A laser control circuit according to claim 1 wherein a diode is coupled between a terminal of said source of DC potential and said first electrode.

5. A laser control circuit according to claim 1 wherein a parallel resistor and capacitor are coupled between a terminal of said source of DC potential and said first electrode.

6. A laser control circuit according to claim 1 wherein said means for controlling said oscillator comprises a diode coupled between said second electrode and an input terminal for said oscillator.

7. A laser control circuit according to claim 1 wherein said source of modulating voltage includes a transformer having a primary winding for receiving a modulating voltage and a secondary winding coupled between said second electrode and a terminal of said source of DC potential.

8. A laser control circuit according to claim 1 wherein said oscillator means comprises: a unijunction transistor having an emitter electrode and first and second base electrodes, said emitter electrode being coupled to said source of DC potential, said first base electrode being coupled to said control electrode of said controlled switch, a first resistor having one terminal coupled to said first base electrode and another terminal coupled to said second electrode of said laser discharge tube, a capacitor coupled between said emitter electrode and said another terminal of said first resistor, a second resistor having one terminal coupled to said second base electrode, a third resistor having one terminal coupled to said emitter electrode, and means for applying a DC potential between the other terminals of said second and third resistors and said another terminal of said first resistor.

9. A laser control circuit comprising: a laser discharge tube having first and second electrodes and containing a gas capable of being ionized by electrical discharge between said electrodes; a source of DC potential having a first terminal and a second terminal; impedance means and a first diode coupled in series between said first terminal and said first electrode; a source of modulating voltage and a second diode coupled in series between said second terminal and said second electrode; a transformer having a primary winding and a secondary winding, a terminal of said secondary winding being coupled to one of said first and second electrodes; means coupled between another terminal of said secondary winding and the other of said first and second electrodes for providing an AC current path through said secondary winding between said first and second electrodes while preventing DC current from said source from flowing through said secondary winding; a controlled switch having a current path and a control electrode, said current path and a capacitor being coupled in series across said primary winding; means for applying charging current to said capacitor; and oscillator means having first and second terminals coupled to the respective electrodes of said second diode and having an output terminal coupled to said control electrode of said controlled switch for applying control pulses to said control electrode to establish current flow through said current path.

10. A laser control circuit comprising: a laser discharge tube having first and second electrodes and containing a gas capable of being ionized by electrical discharge between said electrodes; a source of DC potential having a first terminal and a second terminal; a resistor and a first diode coupled in series between said first terminal and said first electrode; a first capacitor coupled in parallel with said resistor; a first transformer having a primary winding for receiving a modulating voltage and having a secondary winding, said secondary winding and a second diode being coupled in series between said second terminal and said second electrode; a second transformer having a primary winding and a secondary winding, said secondary winding of said second transformer and a third diode being coupled in series between said first and second electrodes; a controlled switch having a current path and a control electrode, said current path and a second capacitor being coupled in series across said primary winding of said second transformer; means for applying charging current to said second capacitor; and oscillator means having first and second terminals coupled to the respective electrodes of said second diode and having an output terminal coupled to said control electrode of said controlled switch for applying control pulses to said control electrode to establish current flow through said current path.

References Cited

UNITED STATES PATENTS

| | | | |
|---|---|---|---|
| 1,955,520 | 4/1934 | Vawter | 315—225 |
| 2,144,520 | 1/1939 | Beck | 315—225 |

RONALD L. WILBERT, Primary Examiner

R. J. WEBSTER, Assistant Examiner

U.S. Cl. X.R.

331—94.5; 315—124, 352